Patented Oct. 17, 1922.

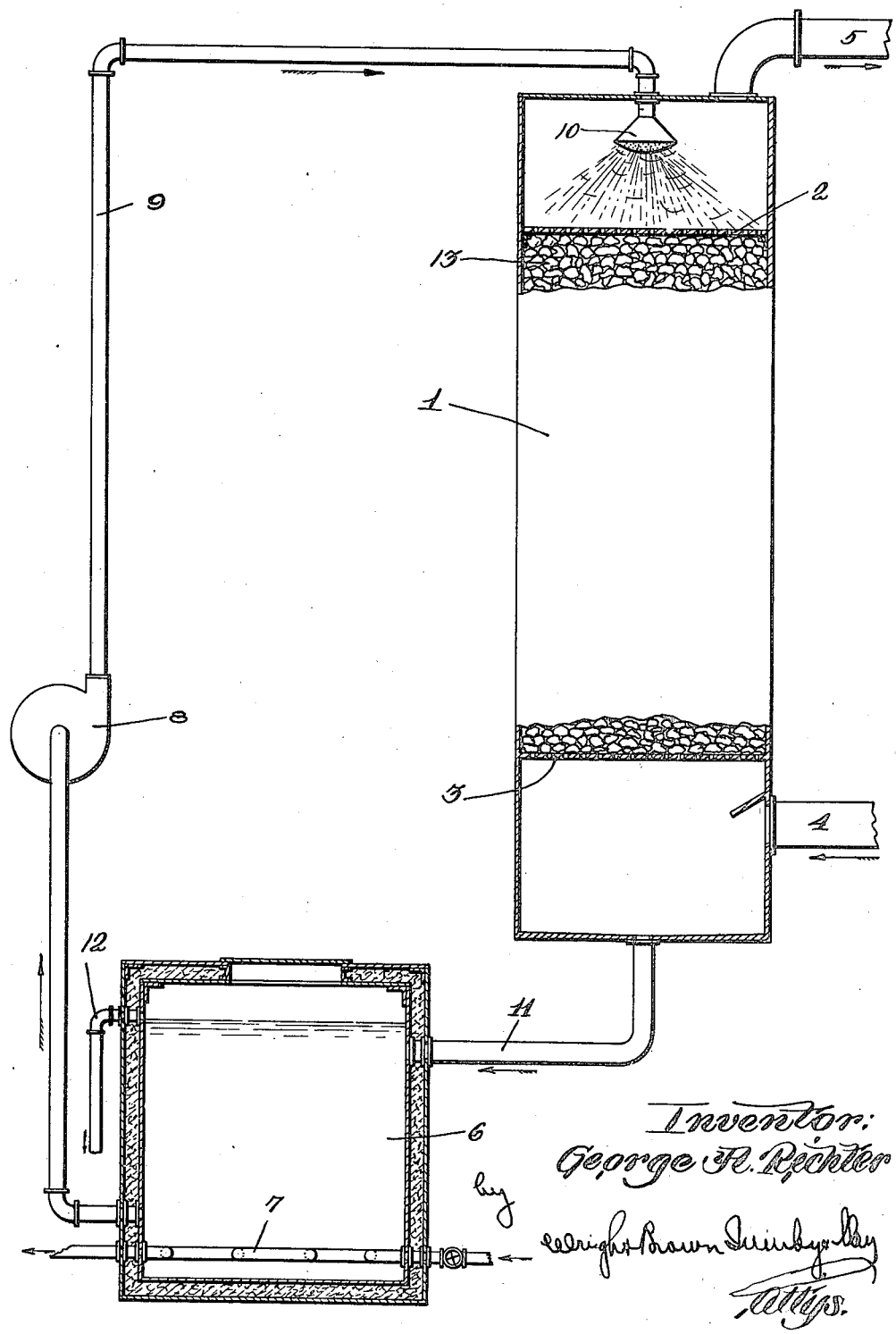

1,431,981

UNITED STATES PATENT OFFICE.

GEORGE A. RICHTER, OF BERLIN, NEW HAMPSHIRE, ASSIGNOR TO BROWN COMPANY, OF BERLIN, NEW HAMPSHIRE, A CORPORATION OF MAINE.

METHOD OF DRYING CHLORINE.

Application filed September 8, 1921. Serial No. 499,224.

*To all whom it may concern:*

Be it known that I, GEORGE A. RICHTER, a citizen of the United States, residing at Berlin, in the county of Coos and State of New Hampshire, have invented new and useful Improvements in Methods of Drying Chlorine, of which the following is a specification.

In the production of chlorine by the electrolytic decomposition of a sodium chloride solution in an electrolytic cell, the chlorine passes off at relatively high temperature and carries off with it a considerable amount of moisture so that the chlorine is largely saturated with water vapor at that temperature. For example, in the commercial operation of electrolytic cells, the chlorine comes off at a temperature of about from 80° to 120° F., depending upon seasonable temperatures, and contains about 1% to 3% moisture by weight. Where it is desired to produce an anhydrous chlorine from such wet chlorine, considerable difficulty is experienced in removing the water from the chlorine, except by the use of sulphuric acid as a drying agent. In a drying system wherein sulphuric acid is used as the drying medium, the removal of the moisture is expensive due to the cost of the sulphuric acid and to the relatively expensive apparatus which must be employed. The expense is increased by the necessity either of wasting the diluted sulphuric acid, or else by the employment of a concentrating system for recovering the acid.

It is known that ordinarily moisture may be recovered from gases by refrigerating out the contained moisture, but, where chlorine and water are reduced in temperature to approximately 49° F., a solid chlorine hydrate is formed such as would plug or render ineffective either a closed or open drier. Consequently it is practically impossible to remove a large proportion of water from chlorine by refrigeration. Thus since the dissociation temperature of chlorine hydrate ($Cl_2:8H_2O$) is about 49° F., chlorine can not be dried by refrigerating it below that temperature without converting the water and some of the chlorine to the hydrate. I have made the discovery that calcium chloride has the peculiar property of lowering the temperature of formation of, and thereby preventing the formation of chlorine hydrate, even though the temperature of the gas be reduced thereby as low as 14° F. That is to say, I have discovered that if chlorine gas, saturated with or mixed with water vapor such as is produced by the electrolysis of sodium chloride solution, be brought into direct contact with refrigerated calcium chloride brine, the gas and vapor mixture may be reduced to a temperature at which the greater portion of the moisture is refrigerated out leaving a practically dry chlorine gas so that the gas may subsequently be made completely anhydrous by a further treatment with a comparatively small amount of sulphuric acid. I have found that approximately 95% of the contained water may be removed from the wet chlorine coming from the electrolytic cells at a temperature of say 100° F., by bringing it into counter-current flow with a calcium chloride solution refrigerated to approximately 14° F. The remaining 5% of the water vapor may then be removed by the usual sulphuric acid process, and in this case, of course, only a very small amount of sulphuric acid is necessary for the removal of the remaining moisture.

On the accompanying drawings, I have illustrated conventionally an apparatus which may be used for drying a wet chlorine gas, but of course it will be understood that the process is not limited to the use of this apparatus. The apparatus, as shown, consists of a tower 1 having confined between perforated partitions 2 and 3 a mass of inert interstitial surface material 13. 4 indicates a conduit for conducting the wet gas from the electrolytic cells (not shown) to the lower end of the tower and 5 represents the outlet therefor for the dried gas from the top of the tower. In the tank 6 is contained calcium chloride brine of about 30% strength. The brine in this tank is chilled by the refrigerating coil to a temperature of about 14° F. 8 indicates a pump by which brine from the tank 6 is forced to the top of the tower through a pipe 9 and delivered through a spray nozzle 10 so as to trickle down through the interstitial inert surface material. The eduction pipe 5 from the dried chlorine is connected to a vacuum pump (not shown) so that the gas is drawn outwardly through the tower in counter-current flow to the brine which trickles down through the interstices of the inert material. The solution, which is caught in the lower portion of the tower, is conducted back to the tank 6 by the pipe 11. As the brine becomes increasingly diluted with the water removed from the wet gas, it is desirable to add calcium chloride from time to time to the tank to maintain the solution at approximately 30% strength. Of course, as the process is carried on from day to day, the volume of the solution increases and the tank is therefore provided with an overflow pipe 12 through which the surplus solution may be caused to overflow from the tank.

It is not necessary to use chemically pure calcium chloride, as technical or commercial calcium chloride containing a small percentage of other salt may be used without detriment to the process. Zinc chloride may be employed in lieu of calcium chloride to prevent the formation of chlorine hydrate, provided the temperature of the zinc chloride solution, containing about 40% of the salt, is not reduced below about 20° F.; but, where zinc chloride solution is employed as the drying agent for the wet gas, I have been unable to remove more than 92%—94% of the contained water, as its reduction below that temperature is followed by the formation of chlorine hydrate.

What I claim is:

1. The process of drying wet chlorine gas which comprises bringing said wet gas into direct contact with a refrigerated solution containing an agent which lowers the temperature of formation of chlorine hydrate.

2. A process of drying wet chlorine gas which consists in bringing said gas into contact with a refrigerated calcium chloride solution.

3. The process of drying wet chlorine gas which consists in bringing said gas into contact with a calcium chloride solution refrigerated to a temperature of about 14° F.

In testimony whereof I have affixed my signature.

GEORGE A. RICHTER.